United States Patent [19]
Lane et al.

[11] 3,795,936
[45] Mar. 12, 1974

[54] HEADLAMP CLEANING DEVICE

[75] Inventors: Robert John Lane, Marston Green; Robert Colston James, Warley, both of England

[73] Assignee: Joseph Lucas (Electrical) Limited, Birmingham, England

[22] Filed: Oct. 24, 1972

[21] Appl. No.: 300,367

[30] Foreign Application Priority Data
Nov. 19, 1971  Great Britain .................... 53792/71

[52] U.S. Cl. ......... 15/250.24, 15/250.27, 15/250.29
[51] Int. Cl. .......................... B60s 1/06, B60s 1/20
[58] Field of Search ......... 15/250.2, 250.24, 250.25, 15/250.26, 250.27, 250.29, 250.16, 250.02, 250.04

[56] References Cited
UNITED STATES PATENTS
3,289,237  12/1966  Lindsey ............................ 15/250.24
3,599,269  8/1971  Congdon ......................... 15/250.04
3,626,543  12/1971  Schaper .......................... 15/250.21
3,667,081  6/1972  Burger ............................ 15/250.24
3,667,082  6/1972  Hoyler ............................ 15/250.02

FOREIGN PATENTS OR APPLICATIONS
1,545,841  10/1968  France ............................ 15/250.24

Primary Examiner—Peter Feldman
Attorney, Agent, or Firm—Holman & Stern

[57] ABSTRACT

A headlamp cleaning device for a vehicle having a twin headlamp system comprises a pair of spaced, parallel actuating rods and a pair of spaced wipers extending between the actuating rods and attached thereto. The actuating rods are slidable in bearings resiliently mounted on the body of the vehicle so that the headlamps are not obscured by the rods. The rods are reciprocated by a common drive and the wipers are arranged so as to be parted off the headlamps when not in use.

3 Claims, 2 Drawing Figures

HEADLAMP CLEANING DEVICE

This invention relates to headlamp cleaning devices and, more particularly, relates to headlamp cleaning devices for use on vehicles having a twin headlamp system.

According to the present invention there is provided a headlamp cleaning device for a vehicle having a twin headlamp system, comprising a pair of spaced wipers, a pair of spaced parallel actuating rods upon which the pair of wipers is mounted to extend transversely between the actuating rods, each actuating rod being slidable in a bearing adapted to be mounted on a fixed part of the vehicle, and common drive means for reciprocating the actuating rods whereby the rods can be mounted on the vehicle, when in use, in such a manner that neither of the headlamps is obscured by the actuating rods and the wipers do not obscure the headlamp when the headlamp cleaning device is not in use.

Preferably, the bearings mounting the actuating rods are themselves provided with biassing means through which they are adapted to be mounted on the vehicle whereby the wipers, in use, are resiliently biassed to press against the headlamps.

Figure 1:
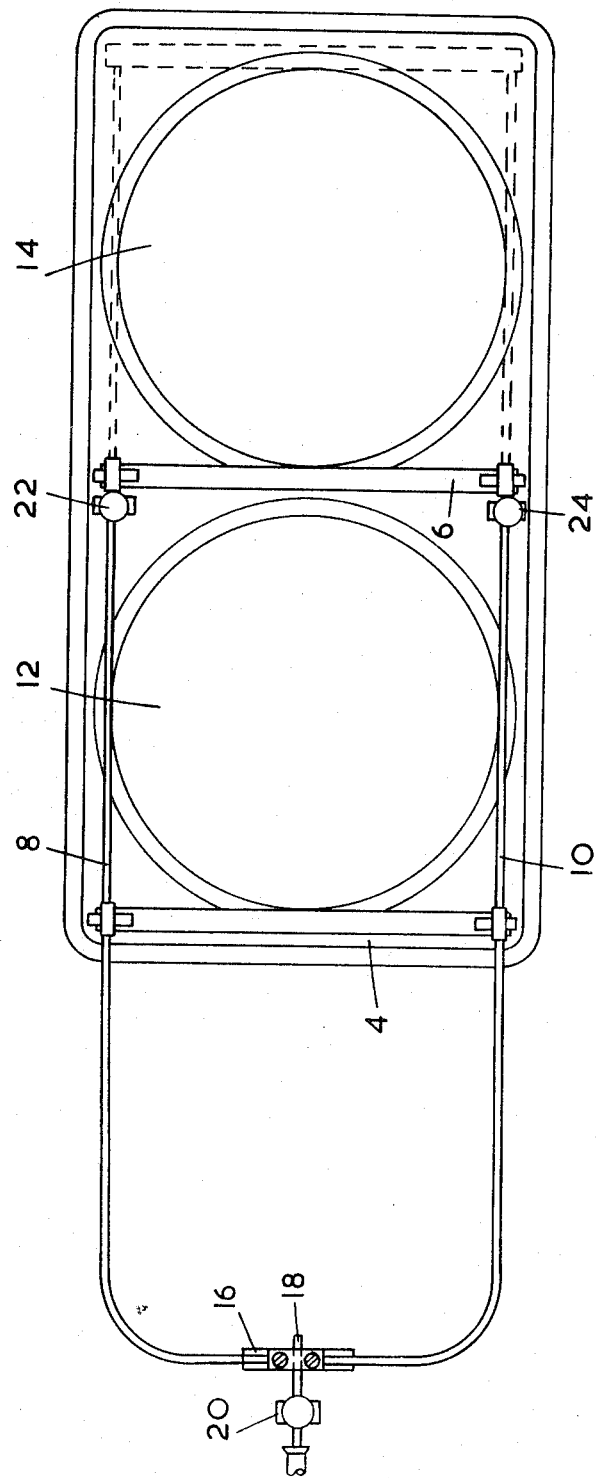
Figure 2:
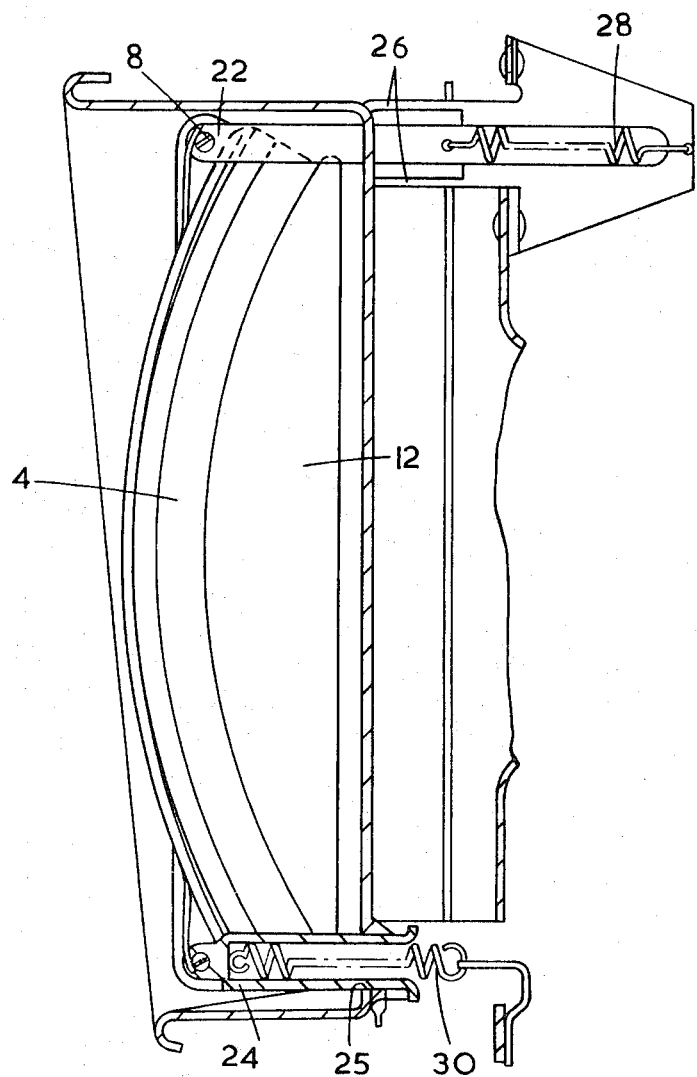

An embodiment of the present invention will now be described, by way of example, with reference to the accompanying drawings, in which:

FIG. 1 is a plan view of a headlamp cleaning device according to the present invention, and FIG. 2 is a sectional view of the device shown in FIG. 1, with alternative spring biassing constructions illustrated.

Referring now to the drawings, the headlamp cleaning device comprises a pair of spaced wipers 4 and 6 mounted to extend between a pair of spaced parallel actuating rods 8 and 10. The spacing between the wipers 4 and 6 and the actuating rods 8 and 10 is just greater than the diameter of the headlamps 12 and 14. At one of their ends the actuating rods 8 and 10 terminate at wiper 6 whilst the other ends extend beyond wiper 4 and are curved to enter a common clamp 16 which is clamped the end of a rack cable 18. The rack cable 18 is mounted for sliding movement in a bearing 20 which is mounted on a fixed part of the vehicle through the intermediary of an extension spring (not shown) which serves to bias the cable 18 resiliently towards the vehicle. Similarly, the rods 8 and 10 are mounted in bearings 22 and 24 disposed between the headlamps 12 and 14 which form one set of headlamps in the vehicle which is of the twin headlamp type.

Referring to FIG. 2, two alternative constructions are disclosed. Referring firstly to the upper part of FIG. 2, the bearing 22 is in the form of a slide having an aperture therethrough for the actuating rod 8. The slide is movable in a pair of guides 26 and is mounted on a fixed part of the vehicle through the intermediary of an extension spring 28. In this manner, the wiper 4 is resiliently urged against the headlamp 12 when the device is in use.

The alternative mode of mounting the actuating rod bearings 22 and 24 is shown in the lower part of FIG. 2 and will be described with reference to the actuating rod 10 and bearing 24. In this instance, the bearing 24 comprises a hollow, apertured tube which is slidable in an aperture 25 and mounted on a part of the vehicle through the intermediary of a tension spring 30.

Two of the headlamp wiping devices described above are mounted on the vehicle, one for each set of headlamps, and are connected by their respective rack cables 18 to a single motor unit which is similar to a motor unit employed for operating the windscreen wipers of a motor vehicle.

It will be manifest that reciprocation of the rack cable 18 causes reciprocation of the rods 8 and 10 and reciprocation of wipers 4 and 6. The arrangement is such that when the wipers 4 and 6 are in their "parked" position, they do not obscure either of the headlamps 12 and 14. Similarly, the spacing of the actuating rods 8 and 10 ensures that, at no stage, do these obscure the headlamps. The headlamp wiping device, in this embodiment, is mounted on the vehicle solely through the intermediary of the bearings 20, 22 and 24.

We claim:

1. A headlamp cleaning device for a vehicle having a twin headlamp system, comprising a pair of spaced wipers, a pair of spaced parallel actuating rods upon which the pair of wipers is mounted to extend transversely between the actuating rods, each actuating rod being slidable in a bearing adapted to be mounted on a fixed part of the vehicle, and common drive means for reciprocating the actuating rods whereby the rods can be mounted on the vehicle, when in use, in such a manner that neither of the headlamps is obscured by the actuating rods and the wipers do not obscure the headlamp when the headlamp cleaning device is not in use.

2. A device as claimed in claim 1, wherein the bearings mounting the actuating rods are themselves provided with biassing means through which they are adapted to be mounted on the vehicle whereby the wipers, in use, are resiliently biassed to press against the headlamps.

3. A device as claimed in claim 1 or 2, wherein the actuating rods are connected together on one side of the wiper blades to a common drive means.

* * * * *